UNITED STATES PATENT OFFICE.

GUSTAV ELKELES AND ERNST KLIE, OF BERLIN, GERMANY.

FURNITURE-POLISH AND PROCESS FOR PRODUCING SAME.

No. 921,382.     Specification of Letters Patent.     Patented May 11, 1909.

Application filed November 18, 1907. Serial No. 402,638.

*To all whom it may concern:*

Be it known that we, GUSTAV ELKELES and ERNST KLIE, chemists, both subjects of the German Emperor, and residents of 60 Strelitzerstrasse, Berlin, German Empire, have jointly invented a new and useful Furniture-Polish and a Process for Producing Same, of which the following is an exact specification.

The adaptability of shellac for certain industrial purposes is not only due to the fact that it contains resinous ingredients which produce a glossy varnish or lacquer, but also to the quantities of wax-like material therein. This wax consists principally of cerylalcohol and myricyl-alcohol of which there is nearly 50 per cent. in a free state, the other portion being bound by stearic, palmitic and oleic acid. By dissolving shellac in alcohol and allowing it to stand, the said wax-like substances are separated. But whereas the alcoholic solution of shellac is, as is well known, well adapted for furniture polishing purposes, providing the wax-like substance be not taken from it by filtering, the same solution assumes at once resinous sticky properties if the wax-like residues are removed and the solution is no longer suitable for polishing. The pad or rubber of the furniture polisher no longer slides easily over the surface of the wood and in fact does not put on the film of polish but rathes takes up parts of the film of polish already put on the wood owing to the sticky properties of this so called polishing solution in the absence of the wax.

Resins from various sources have been employed in producing the different substitutes for shellac, and the main stress was, apart from the property of being dissolved in alcohol, laid upon the gloss-giving ingredients alone. Although attempts have been made to increase the elasticity of the shellac-substitutes by adding fats, oils and their derivatives, it was found in such processes that the object was not attained by adding a small amount of fats and oleic acids and that by increasing the quantity of oil the polish was not glossy but in fact smeared the surface of the wood. Further it has been suggested to form a polish by adding a wax soap to a resin but such saponified wax contains the fatty acids in an objectionable form which destroys the polishing action of the wax alcohol.

The present improvement consists in the admixture of the above mentioned wax-like substances *i. e.* waxes, wax alcohols or other alcohols of high molecular weight to the resins employed as shellac substitutes, for which purpose quite small additions suffice. Only $\frac{1}{2}$ per cent. of a wax alcohol or ester with a high boiling point (or a mixture of both) transforms the previously sticky resin to a finished product which is exceedingly useful for polishing purposes and acts just like leaf-shellac. Such a mixture may be made mechanically or the compounding may also be accomplished chemically. In the following is given an example of the latter method. For the production of such a composition, 100 grams of copal with 20 grams of hydrate of sodium are dissolved in 1000 cubic centimeters of water and to the hot resin solution about .5 gram of Chinese wax is added. The wax begins to melt and is exceedingly finely diffused in the resin solution by means of a rapidly rotating stirring device so as to form an emulsion. If the emulsion of resin and wax be now precipitated by means of a diluted mineral acid, such as sulfuric acid, the shellac-like finished product is obtained after separating the precipitate and then washing and drying the separated mass. The precipitate from the emulsion especially when further treated as hereinafter described is dissolved in alcohol and this solution forms the polish.

Resins and their derivatives, such as for instance chlorid-combinations, if treated according to the present process, show after their precipitation and drying the disadvantage that an alcoholic solution of same, though clear when being dissolved, separates the resin into flakes after a few hours thereby making the product of little value for industrial application. This fault is removed by the following process. After precipitation, the precipitated product is, together with the diluted mineral acid added in excess, heated up to 70–80° C., whereupon the filtration follows. A resin thus treated is, after drying, absolutely soluble in alcohol without forming in resin flakes later on.

Having thus fully described the nature of my invention what I desire to secure by Letters Patent of the United States is:—

1. A polish for furniture and the like composed of an intimate mixture of resin and a small percentage of unsaponified wax and an alcoholic solvent for said mixture, said polish being characterized by an exceedingly fine and even division of the wax throughout the solution.

2. A polish for furniture and the like, composed of the precipitate from an emulsion of resin and a half per cent. addition of unsaponified wax dissolved in alcohol.

3. Process for producing a furniture polish base substance soluble in alcohol comprising dissolving a resin substance together with sodium hydrate in hot water, adding a small quantity of unsaponified wax, stirring the same violently, precipitating the same by means of an acid, filtering, washing and drying said precipitates.

4. Process for producing a furniture polish, base substance soluble in alcohol comprising dissolving a resin substance together with sodium hydrate in hot water adding a small quantity of unsaponified wax stirring the same violently, precipitating the same by means of an excess of mineral acid heating the precipitate together with the excess of acid, filtering, washing and drying said precipitates.

In witness whereof we have hereunto set our hands in the presence of two witnesses.

GUSTAV ELKELES.
ERNST KLIE.

Witnesses:
WOLDEMAR HAUPT,
HENRY HASPER.